United States Patent
Hsu

(10) Patent No.: US 11,108,266 B2
(45) Date of Patent: Aug. 31, 2021

(54) CONTROL METHOD FOR POWER SUPPLY SYSTEM AND POWER SUPPLY SYSTEM

(71) Applicant: Wiwynn Corporation, New Taipei (TW)

(72) Inventor: Kuan-Wei Hsu, New Taipei (TW)

(73) Assignee: Wiwynn Corporation, New Taipei (TW)

(*) Notice: Subject to any disclaimer, the term of this patent is extended or adjusted under 35 U.S.C. 154(b) by 133 days.

(21) Appl. No.: 16/566,889

(22) Filed: Sep. 11, 2019

(65) Prior Publication Data

US 2020/0381937 A1    Dec. 3, 2020

(30) Foreign Application Priority Data

Jun. 3, 2019 (TW) .................................. 108119103

(51) Int. Cl.
*H02J 9/06* (2006.01)

(52) U.S. Cl.
CPC .............. *H02J 9/062* (2013.01); *H02J 9/061* (2013.01)

(58) Field of Classification Search
CPC ................................ H02J 9/062; H02J 9/061
USPC ............................................................ 307/64
See application file for complete search history.

(56) References Cited

U.S. PATENT DOCUMENTS

| 10,148,192 B1 | 12/2018 | Hsu | |
|---|---|---|---|
| 2015/0022003 A1* | 1/2015 | Dighrasker | H02J 9/062 307/65 |
| 2015/0256105 A1* | 9/2015 | Kano | B60L 15/2009 307/10.1 |
| 2018/0006576 A1* | 1/2018 | Jung | H02J 1/00 |

FOREIGN PATENT DOCUMENTS

| TW | 200908510 A | 2/2009 |
|---|---|---|
| TW | 201340550 A | 10/2013 |
| TW | 201624867 A | 7/2016 |

* cited by examiner

*Primary Examiner* — Michael R. Fin
(74) *Attorney, Agent, or Firm* — Winston Hsu

(57) ABSTRACT

A control method for a power supply system includes a driving circuit conducting a switch element of a first backup transforming module of a backup supplying module corresponding to a phase of one of a plurality of power transforming modules in an abnormal operation according to a working signal corresponding to the power transforming module in the abnormal operation, when one of the plurality of power transforming modules corresponding to a three-phase voltage source is in the abnormal operation; and the driving circuit latching unconducted switch elements of at least one of undriven second backup transforming module of the backup supplying module corresponding to the phase, after a logic control circuit detects working signals corresponding to all phases of each backup transforming module, and latching unconducted switch elements corresponding to phases different with the phase of the first backup transforming module.

16 Claims, 4 Drawing Sheets

CONTROL METHOD FOR POWER SUPPLY SYSTEM AND POWER SUPPLY SYSTEM

BACKGROUND OF THE INVENTION

1. Field of the Invention

The present invention relates to a control method for power supply system and power supply system, and more particularly, to a control method for power supply system and power supply system capable of increasing utilization and providing stable direct voltage sources.

2. Description of the Prior Art

With the advancement and development of technology, demands of big data analysis, artificial intelligence (AI) or so are increasing, which need a large amount of computing servers and significant power supplies. For a data center, which needs megawatts (MW) power, the stability of a power supply system is extremely important. A conventional power supply applied for a chassis of a computer system is mainly implemented with a structure of a single-phase module or a three-phase module. The single-phase module takes a power factor correct (PFC) and a direct-current/direct-current (DC/DC) as the single module for utilization. However, when the PFC or the DC/DC of the single module is broken, the power cannot be supplied to the computer system. And, since a conventional server rack consumes kilowatts (KW) power, when an input current is excessive, the single module cannot afford and would result in damage. In the meanwhile, the power is deployed with a massive amount of copper lines, which increases the manufacturing cost.

The three-phase module takes a three-phase voltage source as the input current, and utilizes three sets of PFCs and DC/DC modules. However, when the PFC and DC/DC of any phase module is broken or malfunctioned, the three-phase module cannot work normally because of imbalance phase, and even more, a blackout of current protection might be triggered and burn down coils of the power plant. Regarding the problem, a conventional structure of the three-phase voltage source is equipped with a backup power source, such that the backup power is turned on to achieve a three-phase balance when a main power module corresponding to any phase of the power module is broken or malfunctioned. However, if the main power module operates normally for a long time, a utilization of the backup power is low, which significantly increases overall costs of the system.

Therefore, how to improve the utilization of a power supply system with stable DC output voltage sources to solve the problems mentioned above has become one of objectives in the industry.

SUMMARY OF THE INVENTION

Therefore, the present invention provides a control method for a power supply system and a power supply system, so as to improve the stability of the power supply system and provide stable DC voltage sources.

An embodiment of the present invention discloses a control method for a power supply system, wherein the power supply system comprises a three-phase voltage source, a power supply module, a backup supply module, a logic control circuit, a driving circuit and an enabling circuit, the power supply module comprises a plurality of power transforming modules and each backup transforming module of the backup supply module includes a plurality of switch elements, and the control method comprising the driving circuit generating a switch signal according to a working signal corresponding to the power transforming module in an abnormal operation when one of the plurality of power transforming modules corresponding to the three-phase voltage source is in the abnormal operation, to conduct a switch element of a first backup transforming module of the backup supply module corresponding to a phase of one of the plurality of power transforming modules in the abnormal operation; the enabling circuit generating an enabling signal to the first backup transforming module according to the switch signal; and the driving circuit latching unconducted switch elements of at least one of undriven second backup transforming module of the backup supply module corresponding to the phase, after the logic control circuit detects a first working signal of the first backup transforming module and working signals corresponding to all phases of each backup transforming module, to latch unconducted switch elements corresponding to phases different with the phase of the first backup transforming module.

Another embodiment of the present invention discloses a power supply system, comprising a three-phase voltage source, configured to generate voltage sources corresponding to three phases; a power supply module, comprising a plurality of power transforming modules respectively coupled to the three-phase voltage source, to respectively generate a plurality of direct voltages according to the three phases of the three-phase voltage source; a backup supply module, coupled to the power supply module, wherein the backup supply module comprises at least one backup transforming module corresponding to the three phases of the three-phase voltage source, and each backup transforming module comprises the plurality of switch elements respectively coupled to the three phases of the three-phase voltage source, such that when at least one of the plurality of power transforming modules is in an abnormal operation, the backup transforming module corresponding to the power transforming module in the abnormal operation generates the plurality of direct voltages according to the three-phase voltage source; a logic control circuit, coupled to the power supply module and the backup supply module, configured to determine whether the plurality of power transforming modules and the at least one backup transforming module operate normally or not according to a plurality of working signals corresponding to each of the plurality of power transforming modules and each backup transforming module; and a driving circuit, coupled to the at least one backup transforming module and the logic control circuit, and is configured to generate a switch signal according to the working signal corresponding to the power transforming module in the abnormal operation so as to conduct a switch element of a first backup transforming module of the backup supply module corresponding to the phase of one of the plurality of power transforming modules in the abnormal operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
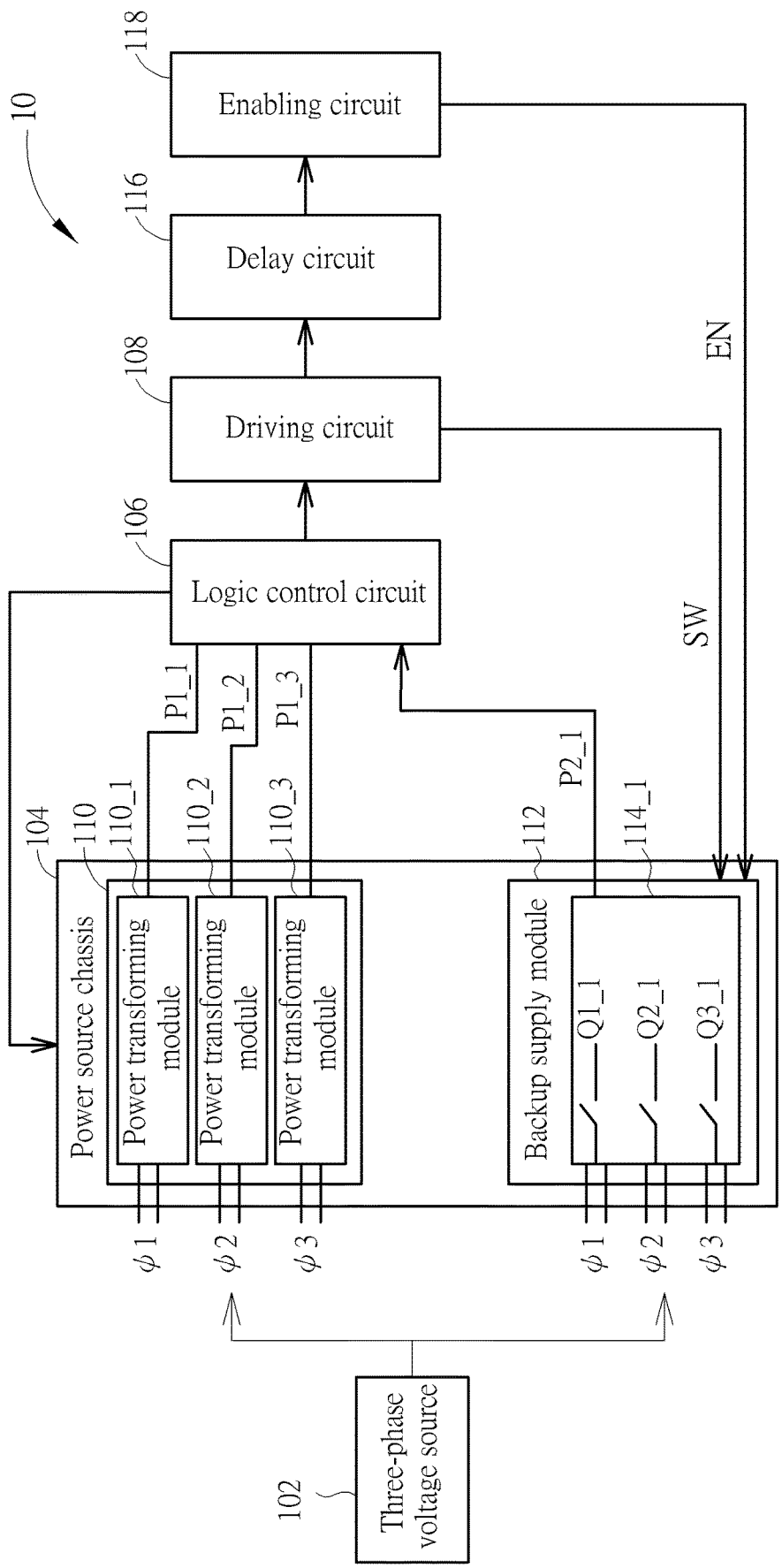
FIG. 1 is a schematic diagram of a power supply system according to an embodiment of the present invention.

Please refer to FIG. 1, which is a schematic diagram of a power supply system 10 according to an embodiment of the present invention. The power supply system 10 includes a three-phase voltage source 102, a power source chassis 104, a logic control circuit 106 and a driving circuit 108, which may provide stable direct current (DC) current output voltages to a system terminal (not depicted in FIG. 1), e.g. a server or a computer system. The three-phase voltage source 102 may be a three-phase alternative-current (AC) voltage source, such as a 380V or 220V three-phase AC voltage source, and the power source chassis 104 transforms the voltage source corresponding to the three phases provided by the three-phase voltage source 102 into AC/DC voltage sources and then provides to the system terminal. In an embodiment, after the transformation of the power source chassis 104, the power supply system 10 outputs 12V/48V DC/DC voltage source to the system terminal.

In detail, the power source chassis 104 of the power supply system 10 includes a power supply module 110 and a backup supply module 112, wherein the power supply module 110 includes power transforming modules 110_1, 110_2, 110_3 corresponding to the three-phase voltage source 102, for generating a plurality of DC voltages according to the three-phase voltage source 102. In this embodiment, the power transforming modules 110_1, 110_2, 110_3 respectively transform the three-phase voltage source 102 corresponding the phases Ø1, Ø2, Ø3 into the corresponding DC voltage sources. That is, the power transforming modules 110_1, 110_2, 110_3 respectively generate the DC voltage sources corresponding to the phases Ø1, Ø2, Ø3 of the three-phase voltage source 102. The backup supply module 112 includes a backup transforming module 114_1, wherein the backup transforming module 114_1 includes a plurality of switch elements Q1_1, Q2_1, Q3_1 respectively coupled to the three phases of the three-phase voltage source 102 for transforming the DC voltage sources corresponding to the phases Ø1, Ø2, Ø3 of the three-phase voltage source 102 when conducted. Therefore, when at least one of the power transforming modules 110_1, 110_2, 110_3 is in an abnormal operation, the backup transforming module 114_1 may generate the DC voltage source corresponding to the phase of the power transforming module in the abnormal operation according to the three-phase voltage source 102.

The logic control circuit 106 is configured to determine whether each of the power transforming modules 110_1-110_3 and the backup transforming module 114_1 are in a normal operation or not, according to working signals P1_1, P1_2, P1_3, P2_1 respectively corresponding to the power transforming modules 110_1-110_3 and the backup transforming module 114_1. The driving circuit 108 is configured to generate a switch signal SW according to the working signal corresponding to the power transforming module in the abnormal operation, so as to conduct a switch element corresponding to a phase of a power transforming module in the abnormal operation of the backup transforming module 114_1. For example, when the power transforming module 110_1 for transforming the voltage source corresponding to the phase Ø1 of the three-phase voltage source 102 is in the abnormal operation, the working signal P1_1 of the power transforming module 110_1 is transferred to the working signal P1_1 referring to the abnormal operation, and the logic control circuit 106 receives the working signal P1_1 referring to the abnormal operation of the power transforming module 110_1, and transmits to the driving circuit 108. The driving circuit 108 accordingly generates the switch signal SW to the backup transforming module 114_1 to conduct the switch element Q1_1 corresponding to the phase Ø1 to generate the DC voltage source corresponding to the phase Ø1, i.e. the backup transforming module 114_1 substituting the power transforming module 110_1 for providing the DC voltage source corresponding to the phase Ø1.

Notably, in the above embodiments, when the logic control circuit 106 determines that anyone of the power transforming modules is in the abnormal operation, the logic control circuit 106 turns off the power transforming module in the abnormal operation. In addition, each of the power transforming modules 110_1, 110_2, 110_3 is parallel connected to each other.

In an embodiment, when the power transforming module 110_1 for transforming the voltage source corresponding to the phase Ø1 of the three-phase voltage source 102 is in the abnormal operation, the logic control circuit 106 receives the working signal P1_1 referring to the abnormal operation of the power transforming module 110_1, and thereby the driving circuit 108 generates the switch signal SW to conduct the switch element Q1_1 of the backup transforming module 114_1 corresponding to the phase Ø1. And then, after a delay circuit 116 delays a period of time, i.e. the DC voltage source corresponding to the phase Ø1 provided by the backup transforming module 114_1 is ready, an enabling circuit 118 generates an enabling signal EN to the backup transforming module 114_1 to activate the backup transforming module 114_1, such that the backup transforming module 114_1 outputs the corresponding DC voltage source (i.e. the DC voltage source corresponding to the phase Ø1) and generates the working signal P2_1 referring to the normal operation. Therefore, when any one of the power transforming modules 110_1, 110_2, 110_3 of the power supply system 10 is broken or in the abnormal operation, the backup supply module 112 may be utilized for providing the DC voltage source corresponding to the power transforming module, which is broken or in the abnormal operation, so as to maintain stable output currents of the power supply system 10.

Figure 2:
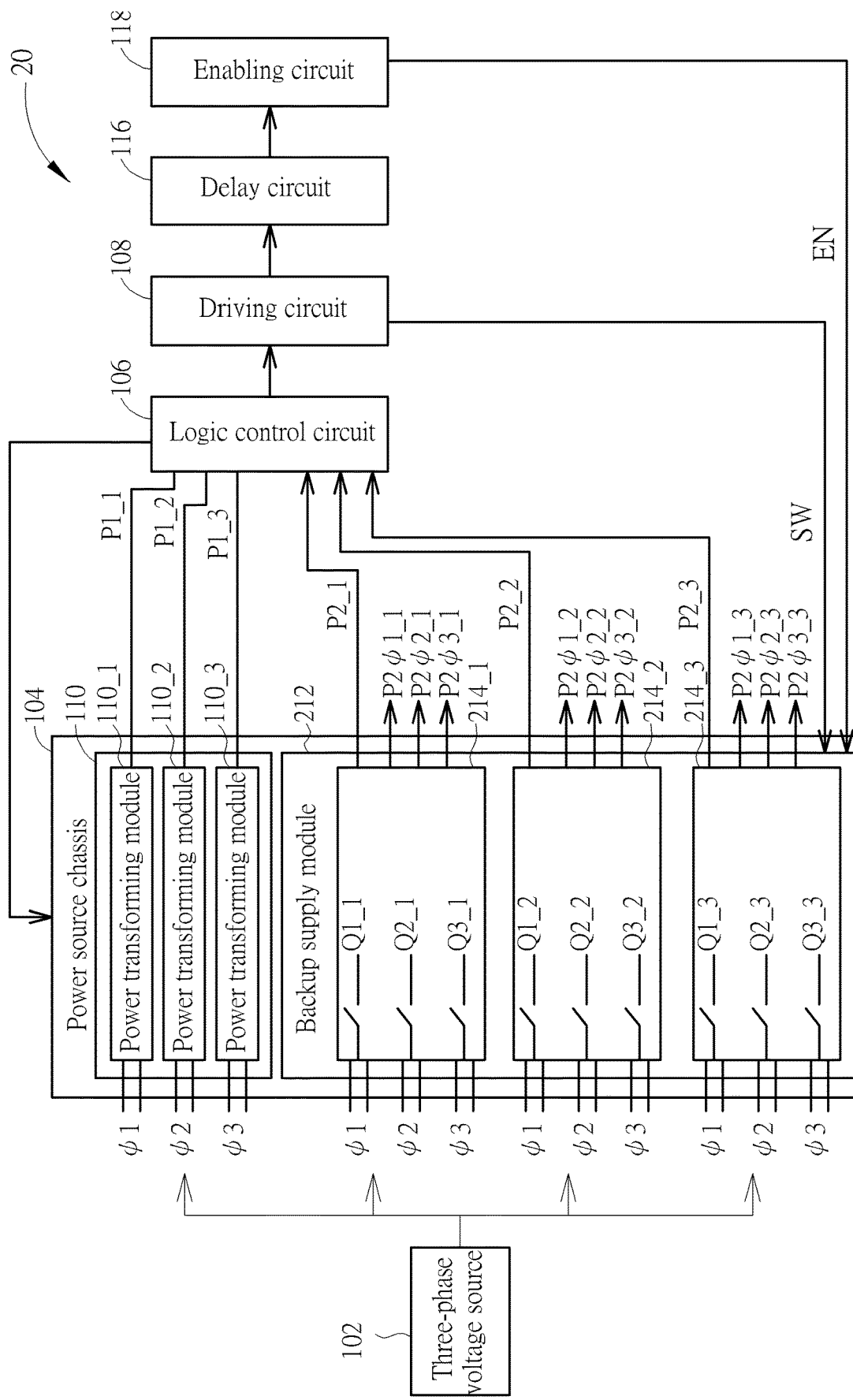
FIG. 2 is a schematic diagram of another power supply system according to an embodiment of the present invention.

Please refer to FIG. 2, which is a schematic diagram of a power supply system 20 according to an embodiment of the present invention. The power supply system 20 has a structure similar to that of the power supply system 10; therefore, the elements in the power supply system 20 having the same function as those in the power supply system 10 are annotated with the same numerals. Different with the power supply system 10, a backup supply module 212 of the power supply system 20 includes a plurality of backup transforming modules 214_1, 214_2, 214_3, wherein each of the backup transforming modules 214_1, 214_2, 214_3 includes a plurality of switch elements Q1_1-Q3_3 to respectively couple to the three phases of the three-phase voltage source 102, so as to transform the voltage sources corresponding to the phases Ø1, Ø2, Ø3 of the three-phase voltage source 102 when conducted. In addition, each of the power transforming modules 214_1, 214_2, 214_3 is parallel connected to each other. Therefore, when at least one of the power transforming modules 110_1, 110_2, 110_3 is in the abnormal operation, at least one of the backup transforming modules 214_1, 214_2, 214_3 may generate the corresponding DC voltage source according to the three-phase voltage source 102, so as to maintain a three-phase balance of the power supply system 20.

For example, when the power transforming module 110_2 is broken or in the abnormal operation (i.e. the power transforming module 110_2 of the power supply system 20 is incapable of providing the DC voltage source corresponding to the phase Ø2), the logic control circuit 106 receives the working signal P1_2 referring to the abnormal operation and transmits the working signal P1_2 to the driving circuit 108. The driving circuit 108 generates the switch signal SW to the backup supply module 212 accordingly. In an embodiment, the power supply system 20 may conduct the switch element Q2_1 corresponding to the phase Ø2 of the backup transforming module 214_1, such that the conducted backup transforming module 214_1 may generate the DC voltage source corresponding to the phase Ø2. Therefore, when the backup transforming module 214_1 is successfully driven, the working signal P2_1 referring to the normal operation is transmitted to the logic control circuit 106. In contrast, when the backup transforming module 214_1 cannot be driven successfully or does not exist, the working signal P2_1 referring to the normal operation is not transmitted or the working signal P2_1 referring to the abnormal operation is transmitted to the logic control circuit 106. In the situation, the logic control circuit 106 may accordingly drive another backup transforming module, i.e. the backup transforming module 214_2 or 214_3 for backup, so as to maintain the three-phase balance of the power supply system 20.

In detail, since the backup supply module 212 of the power supply system 20 includes multiple backup transforming modules 214_1, 214_2, 214_3, when one backup transforming module is not capable of successfully supporting the power transforming module in the abnormal operation, another backup transforming module may be utilized for maintaining the three-phase balance of the power supply system 20. In the situation, when the backup transforming module 214_1 of the backup supply module 212 cannot be successfully driven to generate the corresponding DC voltage source, the logic control circuit 106 may drive the backup transforming module 214_2 to conduct the switch element Q2_2 corresponding to the phase Ø2 of the backup transforming module 214_2, and thereby generate the DC voltage source corresponding to the phase Ø2 to maintain the three-phase balance of the power supply system 20. Notably, when any one of the power transforming modules is broken or in the abnormal operation, an order for the power supply system 20 to drive one of the backup transforming modules 214_1, 214_2, 214_3 is not limited to the above mentioned embodiments, but may be a predetermined order or determined by a computer system, and not limited thereto.

In another aspect, in order to ensure that only one switch element is conducted in one backup transforming module, and the backup supply module 212 only supplies the AC voltage source corresponding to a single phase at a time, the logic control circuit 106 of the power supply system 20 may detect and latch the unconducted switch elements corresponding to the phase Ø2 of the undriven backup transforming modules of the backup supply module 212 (i.e. to latch the unconducted switch elements Q2_1, Q2_3 corresponding to the phase Ø2 of the backup transforming modules 214_1, 214_3), according to the working signal P2_2 referring to the normal operation generated by the driven backup transforming module 214_2 and the working signals P2Ø1_1-P2Ø3_3 corresponding to all phases of each of the backup transforming modules, and latch the unconducted switch elements corresponding to the phase different with the phase of the backup transforming module 214_2 in the abnormal operation (i.e. to latch the switch elements Q1_2, Q3_2 corresponding to the phase Ø1, Ø3 of the backup transforming module 214_2).

Figure 3:
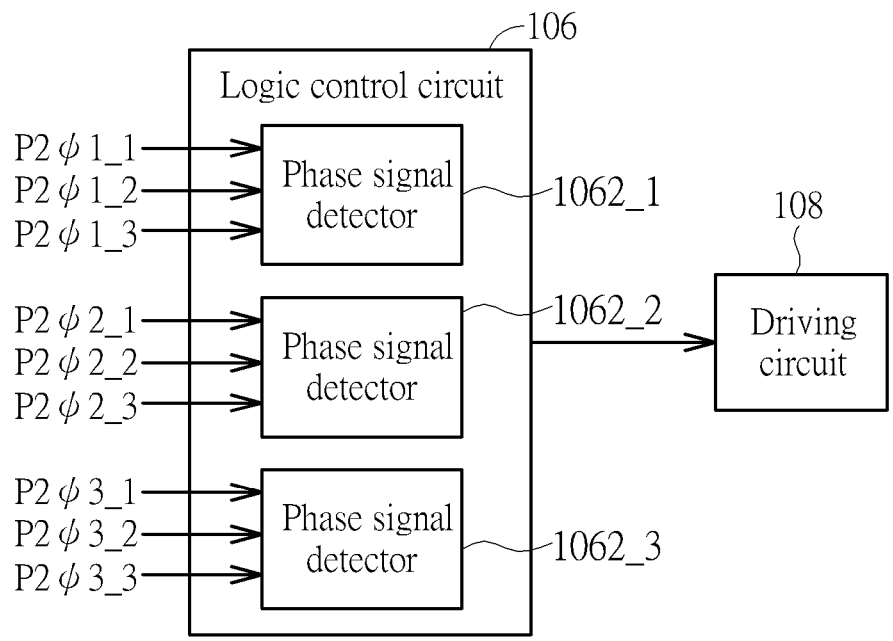
FIGS. 3 and 4 are schematic diagrams of a part of the power supply system in FIG. 2 according to an embodiment of the present invention.

In an embodiment, please refer to FIG. 3, which is a schematic diagram of a part of the power supply system 20 according to an embodiment of the present invention. The logic control circuit 106 may further include a plurality of phase signal detectors 1062_1-1062_3 corresponding to different phases to detect the working signals P2Ø1_1-P2Ø3_3 of the phases of each of the backup transforming modules, such that, after the logic control circuit 106 detects the working signal P2_2 referring to the normal operation generated by the backup transforming module 214_2 (i.e. the backup transforming module 214_2 is back to the normal operation), the logic control circuit 106 inputs inverting working signals P2Ø2_1, P2Ø2_3 of the switch elements Q2_1, Q2_3 corresponding to the phase Ø2 of the undriven backup transforming modules 214_1, 214_3 to the driving circuit 108 according to the working signal P2Ø2_2 generated by the phase Ø2 of the backup transforming module 214_2, so as to latch the switch elements Q2_1, Q2_3 corresponding to the phase Ø2 of the undriven backup transforming modules 214_1, 214_3.

Figure 4:
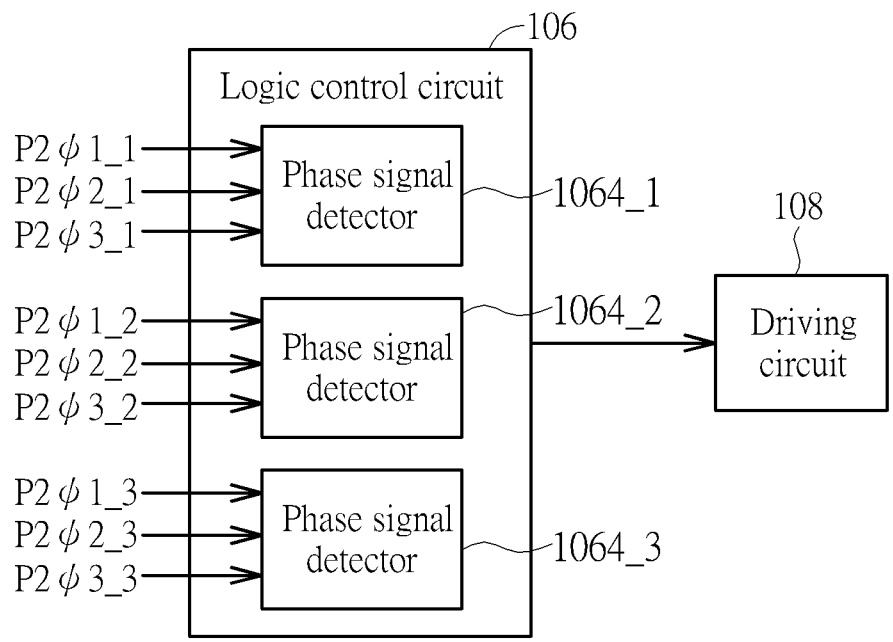
Figure 5:
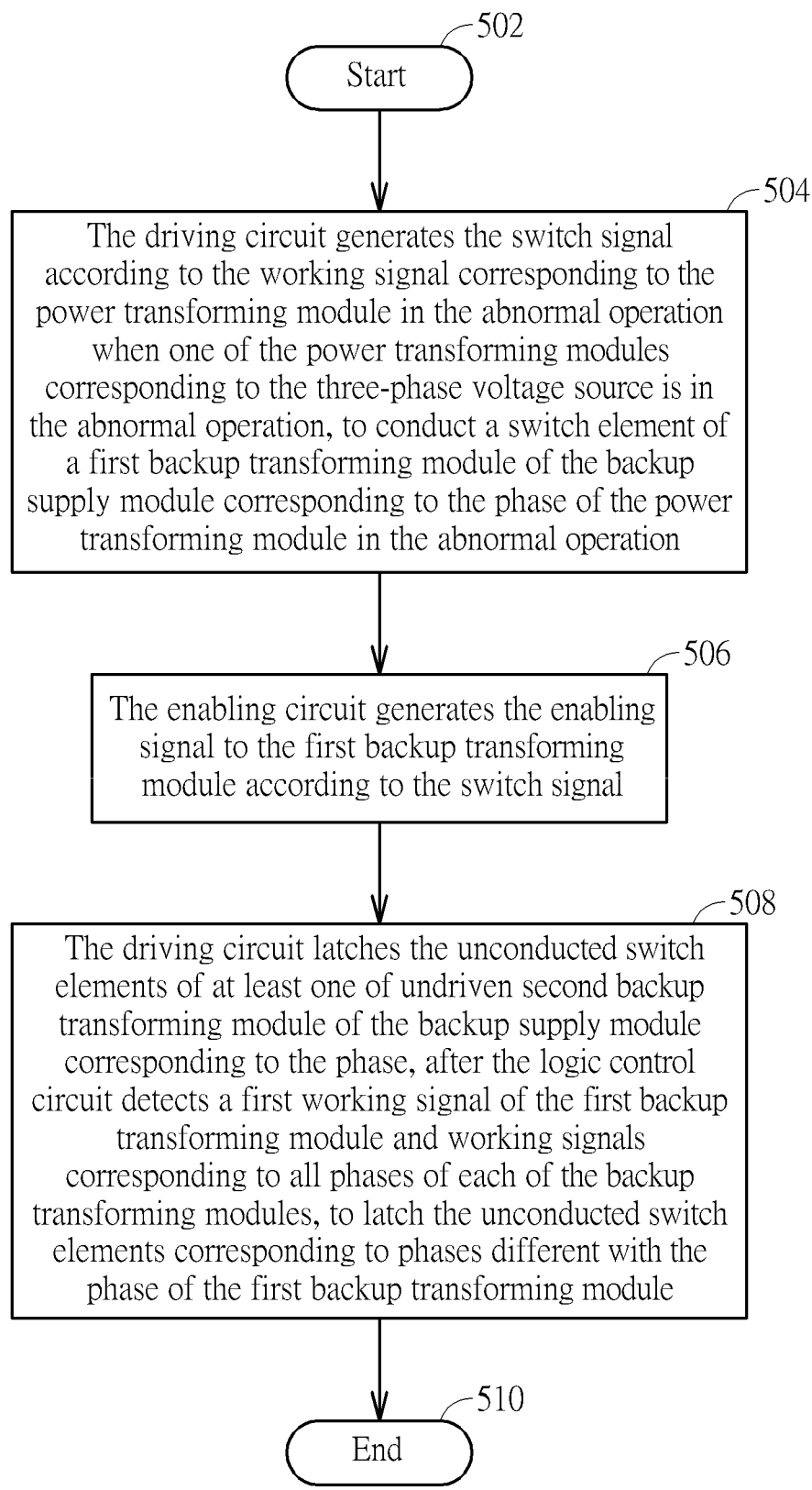
FIG. 5 is a schematic diagram of a control method according to an embodiment of the present invention.

Moreover, please refer to FIG. 4, which is a schematic diagram of a part of the power supply system 20 according to an embodiment of the present invention. The logic control circuit 106 may further include the phase signal detectors 1062_1-1062_3 corresponding to all phases of the same backup transforming module. As such, after the logic control circuit 106 detects the working signal P2_2 referring to the normal operation generated by the backup transforming module 214_2, i.e. the backup transforming module 214_2 is in the normal operation, the logic control circuit 106 inputs inverting working signals P2Ø1_2, P2Ø3_2 of the switch elements Q1_2, Q3_2 corresponding to the phases Ø1, Ø3 of the undriven backup transforming module 214_2 according to the working signal P2Ø2_2 of the phase Ø2 of the backup transforming module 214_2, so as to latch the unconducted switch elements Q1_2, Q3_2.

In another aspect, when the power transforming module 110_2 in the abnormal operation is back to the normal operation, the driving circuit 108 stops conducting the switch element Q2_2 corresponding to the phase Ø2 of the backup transforming module 214_2 according to the working signal P1_2, i.e. the working signal of the power transforming module 110_2 is transferred from the abnormal operation to the normal operation, and the logic control circuit 106 unlatches all switch elements of all backup transforming modules.

The above operations ensure that only one switch element is conducted in one backup transforming module at a time, and the backup transforming module only provides the AC voltage corresponding to the single phase at a time, which may be summarized as a control method 50 to avoid the influence of the three-phase balance of the power supply system because of inputting the same phase at the same time. The control method 50 includes the following steps:

Step 502: Start.

Step 504: The driving circuit generates the switch signal according to the working signal corresponding to the power transforming module in the abnormal operation when one of the power transforming modules corresponding to the three-phase voltage source is in the abnormal operation, to conduct a switch element of a first backup transforming module of the backup supply module corresponding to the phase of the power transforming module in the abnormal operation.

Step 506: The enabling circuit generates the enabling signal to the first backup transforming module according to the switch signal.

Step 508: The driving circuit latches the unconducted switch elements of at least one of undriven second backup transforming module of the backup supply module corresponding to the phase, after the logic control circuit detects a first working signal of the first backup transforming module and working signals corresponding to all phases of each of the backup transforming modules, to latch the unconducted switch elements corresponding to phases different with the phase of the first backup transforming module.

Step 510: End.

Regarding operations of the control method 50, please refer to the above mentioned embodiments of the power supply system 10, 20, and not narrated herein again for brevity.

Notably, when the control method 50 is applied on the power supply system 10, since only the backup transforming module 114_1 exists in the backup supply module 112, the unconducted switch element may be latched by the driving circuit 108.

It should be noted that, those people in the art may make modifications to the power supply system of the present invention according to different system requirements. For example, the switch element of each of the backup transforming modules may be implemented by a one-to-three way switch to switch the voltage source of the single phase at a time. On the other hand, since the backup supply module of the present invention may be modularized to fit slots of the conventional power chassis, multiple backup supply modules may be utilized for improving the stability and the utilization of the power supply system applied on all kinds of devices, or an amount of the power supply module and the backup supply module may be adaptively modified according to different voltage source, and not limited thereto, which all belong to the scope of the present invention.

In summary, the present invention provides a control method for a power supply system and a power supply system, which improves the utilization by controlling the backup transforming module and provides the stable DC voltage sources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a power supply system, wherein the power supply system comprises a three-phase voltage source, a power supply module, a backup supply module, a logic control circuit, a driving circuit and an enabling circuit, and the power supply module comprises a plurality of power transforming modules and each backup transforming module of the backup supply module includes a plurality of switch elements, the control method comprising:

the driving circuit generating a switch signal according to a working signal corresponding to the power transforming module in an abnormal operation when one of the plurality of power transforming modules corresponding to the three-phase voltage source is in the abnormal operation, to conduct a switch element of a first backup transforming module of the backup supply module corresponding to a phase of one of the plurality of power transforming modules in the abnormal operation;

the enabling circuit generating an enabling signal to the first backup transforming module according to the switch signal; and the driving circuit latching unconducted switch elements of at least one of undriven second backup transforming module of the backup supply module corresponding to the phase, after the logic control circuit detects a first working signal of the first backup transforming module and working signals corresponding to all phases of each backup transforming module, to latch unconducted switch elements corresponding to phases different with the phase of the first backup transforming module.

2. The control method of claim 1, wherein when one of the plurality of power transforming modules is in the abnormal operation, the logic control circuit turns off the one of the plurality of power transforming modules in the abnormal operation.

3. The control method of claim 1, wherein the plurality of power transforming modules are parallel connected to each other, and all backup transforming modules of the backup supply module are parallel connected to each other.

4. The control method of claim 1, wherein when the plurality of power transforming modules are in a normal operation, all backup transforming modules of the backup supply module are in a standby mode.

5. The control method of claim 1, wherein the power supply module further comprises a delay circuit coupled between the driving circuit and the enabling circuit, for delaying the enabling signal generated by the enabling circuit, to activate the first backup transforming module after the switch element of the first backup transforming module is conducted.

6. The control method of claim 1, wherein the plurality of switch elements are respectively coupled to three phases of the three-phase voltage source to conduct the switch element of the backup transforming module of the backup supply module corresponding to the phase in the abnormal operation of the power transforming module, according to the corresponding switch signal generated by the driving circuit.

7. The control method of claim 1, wherein when the power transforming module in the abnormal operation is back to the normal operation, the driving circuit stops conducting the switch element corresponding to the phase of the first backup transforming module and the logic control circuit unlatches all switch elements of all backup transforming modules.

8. The control method of claim 1, wherein when the first backup transforming module of the backup supply module corresponding to the power transforming module in the abnormal operation is not capable of operating normally, the driving circuit conducts a switch element corresponding to the phase of the power transforming module in the abnormal operation of the at least one of second backup transforming module of the backup supply module.

9. A power supply system, comprising:
a three-phase voltage source, configured to generate voltage sources corresponding to three phases;
a power supply module, comprising a plurality of power transforming modules respectively coupled to the three-phase voltage source, to respectively generate a plurality of direct current voltages according to the three phases of the three-phase voltage source;

a backup supply module, coupled to the power supply module, wherein the backup supply module comprises at least one backup transforming module corresponding to the three phases of the three-phase voltage source, and each backup transforming module comprises the plurality of switch elements respectively coupled to the three phases of the three-phase voltage source, such that when at least one of the plurality of power transforming modules is in an abnormal operation, the backup transforming module corresponding to the power transforming module in the abnormal operation generates the plurality of direct current voltages according to the three-phase voltage source;

a logic control circuit, coupled to the power supply module and the backup supply module, configured to determine whether the plurality of power transforming modules and the at least one backup transforming module operate normally or not according to a plurality of working signals corresponding to each of the plurality of power transforming modules and each backup transforming module; and a driving circuit, coupled to the at least one backup transforming module and the logic control circuit, and configured to generate a switch signal according to the working signal corresponding to the power transforming module in the abnormal operation so as to conduct a switch element of a first backup transforming module of the backup supply module corresponding to the phase of one of the plurality of power transforming modules in the abnormal operation;

an enabling circuit, configured to generate an enabling signal to the first backup transforming module according to the switch signal.

10. The power supply system of claim 9, wherein when one of the plurality of power transforming modules is in the abnormal operation, the logic control circuit turns off the one of the plurality of power transforming modules in the abnormal operation.

11. The power supply system of claim 9, wherein the plurality of power transforming modules are parallel connected to each other, and all backup transforming modules of the backup supply module are parallel connected to each other.

12. The power supply system of claim 9, wherein when the plurality of power transforming modules are in a normal operation, all backup transforming modules of the backup supply module are in a standby mode.

13. The power supply system of claim 9, further comprising:
a delay circuit, coupled between the driving circuit and the enabling circuit, and configured to delay the enabling signal generated by the enabling circuit, to activate the first backup transforming module after the switch element of the first backup transforming module is conducted.

14. The power supply system of claim 9, wherein after the logic control circuit detects a first working signal of the first backup transforming module and the working signals corresponding all phases of the each backup transforming module, the driving circuit latches the unconducted switch elements corresponding to the phase of at least one undriven second backup transforming module of the backup supply module, and latches unconducted switch elements corresponding to phases different with the conducted phase of the first backup transforming module.

15. The power supply system of claim 9, wherein when the power transforming module in the abnormal operation is back to the normal operation, the driving circuit stops conducting the switch element corresponding to the phase of the first backup transforming module and the logic control circuit unlatches all switch elements of all backup transforming modules.

16. The power supply system of claim 9, wherein when the first backup transforming module of the backup supply module corresponding to the power transforming module in the abnormal operation is not capable of operating normally, the driving circuit conducts the switch element corresponding to the phase of the power transforming module in the abnormal operation of the at least one of second backup transforming module of the backup supply module.

* * * * *